United States Patent [19]
Goldfein

[11] 3,939,656
[45] Feb. 24, 1976

[54] HYDROSTATIC TRANSMISSION PUMP
[75] Inventor: Harold A. Goldfein, Lincolnwood, Ill.
[73] Assignee: Inca Inks, Inc., Northbrook, Ill.
[22] Filed: Feb. 2, 1973
[21] Appl. No.: 329,027

[52] U.S. Cl. .................. 60/381; 60/444; 60/456; 60/464; 91/196
[51] Int. Cl.² .................. F15B 9/04; F15B 21/04
[58] Field of Search ............. 60/369, 378, 381, 382, 60/383, 403, 443, 444, 456, 464, DIG. 5, 431, DIG. 2; 91/196

[56] References Cited
UNITED STATES PATENTS

| | | | |
|---|---|---|---|
| 2,286,358 | 6/1942 | Geiger | 60/381 X |
| 2,961,829 | 11/1960 | Weisenbach | 60/456 X |
| 2,984,985 | 5/1961 | MacMillin | 60/97 P |
| 3,236,049 | 2/1966 | Reinke | 60/444 |
| 3,369,490 | 2/1968 | Hawk | 60/403 X |
| 3,528,243 | 9/1970 | Cryder et al. | 60/444 X |
| 3,559,533 | 2/1971 | Maasshoff | 91/191 |
| 3,580,138 | 5/1971 | Maasshoff | 91/277 |

*Primary Examiner*—Edgar W. Geoghegan
*Attorney, Agent, or Firm*—Lockwood, Dewey, Zickert & Alex

[57] ABSTRACT

An improved hydraulic drive system for a doubleacting hydraulic cylinder which drives or rocks the walking beam of an oil well pump. A closed circuit hydrostatic drive system is used to operate the double-acting hydraulic power cylinder unit and includes a variable displacement reversing swashplate pump driven at a predetermined constant speed by a prime mover such as an electric motor. Suitable automatic control means are provided for synchronizing the reversing movement of the swashplate with the rocking movement of the walking beam.

10 Claims, 2 Drawing Figures

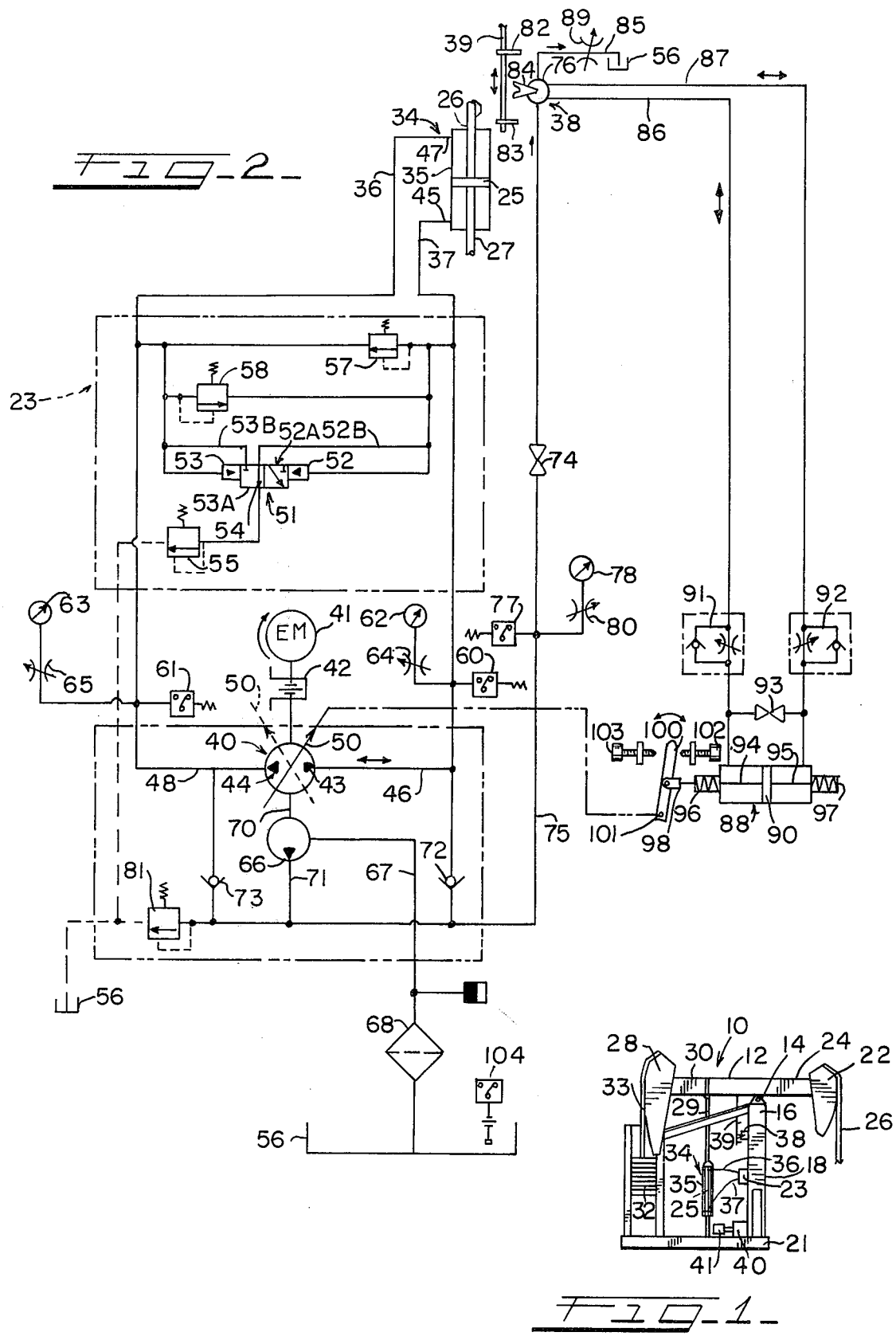

HYDROSTATIC TRANSMISSION PUMP

This invention relates generally to innovations and improvements in hydraulic driving and control means for use with oil well pumping installations of the type having a walking or rocking beam pivotally supported on a so-called Samson post with a polish rod connected to one end of the beam and counterweights supported or connected with the opposite end. Hawk U.S. Pat. No. 3,369,490 dated Feb. 20, 1968 discloses an oil well pumping apparatus wherein a walking beam is driven or operated so as to have rocking movement imparted thereto by means of a double-acting hydraulic cylinder. Maasshoff U.S. Pat. No. 3,559,533 dated Feb. 2, 1971 discloses a similar apparatus and installation wherein the piston and piston rod of a double-acting hydraulic power cylinder are retained in a stationary position while the cylinder portion thereof is reciprocated upwardly and downwardly so as to impart rocking movement to the walking beam or rocking beam. Maasshoff U.S. Pat. No. 3,580,138 dated May 25, 1971 discloses an improved valve operating mechanism for use with the hydraulic driving systems of either U.S. Pat. No. 3,369,490 or U.S. Pat. No. 3,559,533. These three patents may be regarded as representative of the prior art with which the present invention is concerned and with respect to which it adds certain innovations and improvements.

For example, the present invention may be considered as providing an improved hydraulic drive system for use in operating or powering the double-acting hydraulic cylinder means of an oil well pump of the type disclosed in Maasshoff U.S. Pat. No. 3,559,533 so as to impart rocking movement to the walking beam thereof. Briefly stated, the innovations and improvements of the present invention reside in employing a closed circuit hydrostatic drive system which is operatively connected for powering or driving a double-acting hydraulic cylinder mechanism which in turn drives or imparts rocking movement to the walking beam. The closed circuit hydrostatic drive system is also operatively connected with the reversing control means of the pumping apparatus. The closed hydrostatic drive system includes a variable displacement reversing swashplate pump, a prime mover such as an electric motor for driving the pump at a predetermined constant speed, and suitable hydraulic circuit and valve means operatively interconnecting the pump and double-acting hydraulic cylinder means. The reversing control means which is connected with the walking beam is also interconnected with the swashplate of the pump for reversing the same in synchronism with the rocking movement of the walking beam.

The object of the present invention, generally stated, is the provision of an improved hydraulic drive system for the walking beam of an oil well pumping installation or the like which driving system is operatively interconnected with a double-acting hydraulic power cylinder and characterized by inclusion of a closed circuit hydrostatic drive including a variable displacement reversing swashplate pump and a prime mover which drives the pump at a predetermined constant speed.

A further object of the invention is the provision of a closed circuit hydrostatic drive system of the type or class described which affords the following advantages or improvements in a hydraulic oil well pumping installation or the like: dynamic braking, improved efficiency, reliability, controllability, adjustability, simplicity, serviceability and other advantages inherent in a hydrostatic drive such as infinitely variable regulation of output speed, smooth acceleration, lower inertia of moving parts allowing rapid starting, stopping and reversing with outstanding smoothness, accuracy and precision, and shock free reversals without using accumulators.

Certain other objects of the invention will in part be obvious and will in part appear hereinafter.

For a more complete understanding of the nature and scope of the present invention reference may now be had to the following detailed description of a preferred embodiment thereof taken in connection with the accompanying drawings wherein:

FIG. 1 is a side elevational view of a well pumping apparatus or installation incorporating a closed circuit hydrostatic drive system in accordance with the present invention; and, FIG. 2 is a diagram of one form of closed hydrostatic drive system operatively connected with the walking beam and the double-acting hydraulic cylinder means of the apparatus or installation of FIG. 1 in accordance with the present invention.

Referring to FIG. 1, an oil well pumping apparatus or installation of the type shown in Maasshoff U.S. Pat. No. 3,580,138 is indicated generally at 10. The apparatus or installation 10 includes a walking beam 12 which is pivotally supported at 14 on the upper end 16 of Samson post 18 which has its lower end mounted on a base 21. If desired, the Samson post 18 may be hollow and thereby serve as a tank or reservoir for the hydraulic fluid. A horsehead 22 is mounted on the forward (right hand) end 24 of the walking beam 12. Typically, a conventional polish rod (not shown) connected to a well pump in an oil well is supported by one or more cables 26 from the horsehead 22. Another horsehead 28 is mounted on the rearward (left hand) end 30 of the walking beam 12 and counterweights 32 are supported in known manner by one or more cables 33 from the horsehead 28. A double-acting hydraulic cylinder unit indicated generally at 34 of known type is provided which includes a vertically reciprocating cylinder 35. The hydraulic operating mechanism in the form of the double acting power cylinder 34 includes a stationary piston 25 and the manner in which the hydraulic double-acting cylinder unit 34 is mounted and operatively connected to the rocking beam or walking beam 12 through rods 29 is described in detail in the above-mentioned Maasshoff U.S. Pat. No. 3,559,533.

Pressurized hydraulic fluid is alternately admitted and discharged to and from the opposite ends of the cylinder 35 through flexible hydraulic fluid lines 36 and 37 extending from a cross over and relief valve block or unit indicated at 23 and which may be mounted on the Samson post 18 as shown or elsewhere as desired. A four-way control valve unit 38 is also mounted on the post 18 and has a trip or actuator which is operated by a vertically reciprocating control rod 39 operatively connected to the walking beam 12, for example, as shown and described in Maasshoff U.S. Pat. No. 3,580,138.

A variable displacement reversing swashplate pump 40 is mounted on the base 21 and is driven by a constant speed electric motor 41. The various hydraulic fluid lines which extend between the pump 40, the cross over and relief valve block 23 and the four-way control valve unit 38 may be mounted on the Samson post 18 which, if hollow, may also provide the reservoir or tank for the hydraulic fluid of the system.

Reference may now be had to FIG. 2 of the drawings for a more complete and detailed description of the closed circuit hydrostatic drive system for the double-acting cylinder unit 34. The pump 40 is classified as a variable displacement reversing swashplate pump and is of known type and available commercially from several manufacturers. One make and model that is satisfactory is a Sundstrand Model 25-2008 pump which may be driven by a constant speed electric motor 41 such as a 50-horsepower, 1800 rpm motor. The motor is suitably coupled to the pump 40 as indicated diagrammatically at 42.

The pump 40 has two main ports which may be referred to as discharge/return ports 43 and 44. The port 43 is interconnected with one of the inlet/outlet ports 45 of the double-acting cylinder 34 through lines 46–37 and the discharge/return port 44 of the pump 40 connected with the second inlet/outlet port 47 of the double-acting cylinder 34 through lines 48–36, in connection with the cross over relief valve block indicated diagrammatically at 23. It will be seen that the line 46 communicates with the line 37, while the line 48 communicates with line 36 in connection with the block 23.

It will be understood that the pump 40 can be set to operate at a desired constant volume within its operating pressure range such for example as up to 3,500 psi, and that the desired rate of discharge will be maintained in whichever of the discharge/return ports 43 or 44 is serving as a discharge port while the pressure in the other port which is serving as a return port is substantially lower such as for example as 200 psi, and that during reversal, the sum of the pressures in both ports is substantially constant, and the same is true during other than reversal modes. The discharge rate and pressure are maintained in whichever of the ports 43 or 44 is serving as the discharge port until such time as the position of the swashplate is reversed, the swashplate of pump 40 being indicated diagrammatically in FIG. 2 at 50.

It is desired to divert a portion (e.g. 15%) of the hydraulic fluid to the reservoir or tank for cooling purposes and this entails the use of a cross over valve indicated diagrammatically at 51. When port 43 is the pump discharge port, pressure in lines 46 and 37 is in communication with inlet 52 shifting the spool of the cross over valve 51 so that 52-A section thereof moves to the left. Then lines 48 and 36 through line 53-B are in communication with outlet 54 so that part of the fluid flowing in lines 48 and 36 (e.g. 15%) discharges through outlet 54 to relief valve 55, set at about 130 psi and to tank indicated diagrammatically at 56. The majority of the fluid (e.g. 85%) flowing in 48 and 36 returns to the pump 40 through port 44. When the swashplate is reversed and port 44 is the pump discharge port, pressure in lines 48 and 36 is in communication with inlet 53 shifting the spool of the cross over valve so that section 53-A moves to the right. Then lines 46 and 37 through line 52-B are in communication with outlet 54 so that part of the fluid flowing in lines 46 and 37 (e.g. 15%) discharges through outlet 54 to the relief valve 55 and on to tank 56. The majority of the fluid (e.g. 85%) flowing in 46 and 37 enters the pump 40 through port 43. The cross over valve 51 and relief valve 55 may be combined in a valve of known type such as a Sundstrand Model 9800632-16 cross over relief.

It is desirable to provide a pressure-relief valve 57 for lines 46–37 and a second pressure-relief valve 58 for lines 48–36. If the normal operating discharge pressure of the pump 40 is 1,000 psi the pressure relief valves 57 and 58 may typically be set at 3,000 psi. Each of the lines 46 and 48 is provided with a pressure switch 60 and 61, respectively, which may be set to operate at a pressure somewhat in excess of the normal operating pressure. For example, if the pump 40 is operated so that the normal discharge pressures in the ports 43 and 44 is 1,000 psi then the switches 60 and 61 may be set to function at a pressure of 1,650 psi. If the pressure in either line 46 or 48 rises above 1,650 psi, the appropriate switch 60 or 61 will operate to de-energize the motor 41. Each line 46 and 48 is also provided with an indicating pressure gauge 62 and 63, respectively, each of which is provided with its own shut-off valve 64 and 65, respectively. These shut-off valves are normally closed except when the pressure is being admitted to the respective gauges for reading purposes.

Since a portion of the hydraulic fluid being returned from the double-acting cylinder unit 34 to the pump 40 (e.g. 15%) is to be diverted to the reservoir or tank 56 for cooling purposes, it will be necessary to make up this diverted amount and in addition make up the fluid that is lost due to leakage in the system. Accordingly, for this purpose a charge pump or make-up pump 66 is provided. The make-up pump 66 takes in fluid from the reservoir 56 through an inlet line 67 which is provided with an oil filter 68. The discharge pump 66 communicates through line 70 with the make-up fluid port of the pump 40 and discharges make-up fluid through line 71 which is connected through a check valve 72 with the line 46 and through a check valve 73 with the line 48. The discharge line 71 also communicates through a ball valve 74 in line 75 with the inlet port of a four-way control valve 76. The line 75 is provided with a pressure-actuated switch 77 which is set to operate at a pressure below which the motor 41 will be automatically turned off, e.g. when the charge pump pressure falls below 160 psi, for example, such as due to a clogged filter. The line 75 is also provided with a pressure gauge 78 and a turn-off valve 80. A relief valve 81 is provided between the discharge line 71 of the charge pump 66 and the reservoir 56 for by-passing any excess fluid that may be discharged from the make-up pump 66.

As described in detail in aforementioned U.S. Pat. No. 3,559,533 the double-acting cylinder unit 34 is provided with a stationary piston 25 having an upper piston rod 26 extending from the top thereof and a lower piston rod 27 extending from the underside thereof with these piston rods being suitably anchored or restrained at their respective outer ends against vertical movement. The cylinder 35 is free to move or reciprocate in a vertical direction. By means of suitable linkage 29 (FIG. 1) the cylinder 35 is operatively connected to the walking beam 12 for imparting rocking movement thereto as described in U.S. Pat. No. 3,559,533. However, it will be understood that the cylinder 35 may be anchored and the piston 25 reciprocated with the upper piston rod operatively connected with the walking beam and with the lower piston rod 27 free at its outer end.

The control mechanism for alternately admitting pressurized fluid to inlet/outlet ports 45 and 47 and for alternately allowing fluid to be expelled through the other of inlet/outlet ports 45 or 47 includes a vertically reciprocating rod 39 which is operatively connected in known manner with the walking beam 12 as fully described in Maasshoff U.S. Pat. No. 3,580,138. The rod 39 carries a pair of adjustable blocks 82 and 83 which alternately engage off-set extensions on a trip or toggle actuator 84 so as to alternately turn the element 84 downwardly and upwardly with a snap action. The trip or toggle operator 84 serves to operate the four-way valve 76 which has one port connected with the line 75 from the make-up pump 66, a second port connected with line 85 leading to the system reservoir or tank 56, and two ports connected with lines 86 and 87. Reference is made to U.S. Pat. No. 3,580,138 for a detailed description of the valve operating mechanism which includes the reciprocating control rod 39, blocks 82 and 83, and trip or toggle actuator 84. If desired, the valve operating or reversing mechanism disclosed in Hawk U.S. Pat. No. 3,369,490 may be used for operating or controlling the four-way valve 76.

In one position of the valve 76 line 86 is placed in communication with line 75 while line 87 is in communication with line 85 provided with a flow control valve 89. In the second condition of valve 76 line 75 is in communication with line 87 while 86 is in communication with line 85. The lines 86 and 87 are connected with ports at opposite ends of a control cylinder unit 88 which is stationary and which has a double-acting piston 90 therein. The lines 86 and 87 are provided with flow control valves 91 and 92, respectively, and on the discharge side of these control valves lines 86 and 87 are interconnected by a manually operated by-pass valve 93. The flow control valves 91 and 92 are of the known commercial type which pass predetermined volumes of fluid.

The opposite ends of the piston rods 94 and 95 projecting from opposite sides of the piston 90 extend into centering spring attachments 96 and 97, respectively. By means of the attachments 96 and 97, the piston 90 may be adjusted from time to time as required to the centered position when the pressure on opposite sides thereof is equal.

The piston rod 94 extends to a clevis 98 which is pivotally connected to a swashplate operator lever 100 which, as diagrammatically indicated, is in turn connected with the swashplate 50 of the pump 40. The operator lever or handle 100 is pivoted at the bottom as indicated at 101 and the distance which it can be shifted or reciprocated in opposite directions is determined by the positioning of set screws 102 and 103.

As a precaution against loss of fluid, the reservoir or tank 56 is provided with a low-level switch 104 of known commercial type which operates to de-energize the motor 41 in the event the liquid in the reservoir or tank 56 falls below a minimum safe operating level.

In the condition shown in FIG. 2 the system is in the neutral or inactive position in that the piston 25 of the double-acting power cylinder unit 34 is in an intermediate position, the trip or toggle actuator member 84 for the four-way control valve unit 38 is in the intermediate position, the piston 90 of the control cylinder 88 is in intermediate position, and the swashplate operator 100 and swashplate 50 are in their vertical or intermediate position. In this condition with the motor 41 driving the pump 40, the pressure on the system will be maintained at low value (e.g. 240 psi) and there will be no appreciable flow of fluid in the system since the pump 40 will not be discharging fluid. To put the system in operation, the actuator 84 may be manually operated to turn it to one of its two opposing positions. Assuming, for example, that the trip or actuator 84 is moved so as to permit fluid to pass from line 75 into line 86. On passing through the flow control valve 91 fluid will flow into the chamber on the left-hand side of the piston 90 causing it to move to the right and discharge fluid through the line 87 to the tank or reservoir through the line 85. As the piston 90 moves to the right at a rate determined by the setting of the flow control valve 92, the swashplate operator 100 is also pulled to the right until it engages the end of the right-hand adjusting screw 102. As a result of this movement of the swashplate, operator 100 and corresponding movement of the swashplate 50 as it is tilted to one of its opposed positions, the pump 40 will begin to discharge fluid through one of its discharge/return ports 43 or 44. Assuming that when the swashplate operator 100 and swashplate 50 are moved to the right so that fluid is discharged through the discharge/return port 43 of the pump 40, this fluid will then be delivered through the line 46 to the cross over and relief valve block 23 and also through the line 37 into the lower inlet/outlet port 45 of the double-acting cylinder unit 34 causing the cylinder 35 to move downwardly thereby rocking the walking beam 12 in the counterclockwise direction as viewed in FIG. 1. As the cylinder 35 moves downwardly, it will be seen that the fluid retained above the piston 25 will be expelled through the inlet/outlet opening 47 into line 36 communicating with the cross over and relief valve block 23. On passing through the cross over and relief valve block 23 approximately 15% will flow through the cross over valve 51 and cross over relief valve 55 to tank or reservoir for cooling while approximately 85% discharges through line 48 for return to the pump 40 through discharge/return port 44.

It will be understood that with the full pump pressure being applied to line 46 while only return line pressure is applied to line 48, the pressure on port 52 of the cross over valve 51 will be higher than on port 53 thereof and this will actuate the cross over valve 51 in such a way that the line 48 is placed in communication with the discharge port 54 through line 53-B so that a desired portion of the liquid flowing through line 48 is diverted first through the cross over valve 51 and then through the cross over relief valve 55 to be returned to the reservoir or tank 56. The pressure relief valve 57 operates to relieve any pressure in lines 46–37 in excess of its setting (e.g. 3,000 psi) by allowing the liquid to by-pass to line 48.

The foregoing condition continues to exist until the upper block 82 on the control rod 39 engages the trip lever 84 and carries it downwardly from its upper position to its downward position whereupon the above described condition is reversed. When this reversal takes place lines 48 and 36 will be under the full pump pressure thereby shifting the cylinder 35 upwardly and driving the walking beam upwardly. This movement continues until the lower trip 83 on the operating rod 39 engages the trip 84 and moves it to its upper position thereby completing one cycle and initiating the next. The next cycle is the same as the first except that the rate of reversal of the pump may be different depending on the setting of the flow control valve 91 or 92. If flow control valves 92 and 91 have the same setting or are omitted, then flow control valve 89 in line 85 will control the rate of reversal which will be the same in both directions.

What is claimed as new is:

1. In combination with a well pumping apparatus having, a walking beam pivotally supported for rocking movement and adapted to have a polish rod connected to one end thereof and counterweights to its opposite end, double-acting hydraulic cylinder means operatively connected with said walking beam for imparting rocking movement thereto, and reversing control means operatively associated with said walking beam for sensing the movement of said beam and controlling the action of said double-acting cylinder means in driving said walking beam: a substantially closed circuit hydrostatic drive system operatively connected in driving relationsip with said double-acting hydraulic cylinder means and operatively connected with said reversing control means for control thereby, said circuit hydrostatic drive system comprising, a variable displacement reversing swashplate pump, a prime mover operatively connected with said pump for driving the same at predetermined speed, hydraulic circuit means operatively interconnecting each of two discharge/return ports of said pump with one of two inlet/outlet ports of said double-acting hydraulic cylinder means, and means operatively interconnecting said reversing control means with the swashplate of said pump for reversing the same in synchronism with the rocking movement of said walking beam, said reversing control means including a four-way valve and actuating means therefor whereby each time said walking beam rocks up or down said four-way valve is actuated into one of its two operative positions, said four-way valve having a pressure inlet port interconnected with a pressure discharge connection of a make-up pump supplying fluid under pressure to said variable displacement reversing swashplate pump, an outlet port, and a pair of discharge/return ports, and said four-way valve in one of its operative positions having one of said discharge/return ports in communication with said inlet port with the other discharge/return port in communication with said outlet port and in the other of its operative positions having said one of its discharge/return ports in communication with said discharge port and having said other discharge/return port in communication with said inlet port, and wherein said means operatively interconnecting said reversing control means with the swashplate of said pump comprises a second double-acting cylinder means having two inlet/outlet ports each of which is interconnected with one of said discharge/return ports of said four-way valve whereby said second double-acting cylinder means is actuated in one direction when said four-way valve is in one of its operative positions, and linkage means operatively interconnecting said second double-acting cylinder means with said swashplate.

2. In the combination called for in claim 1 said double-acting hydraulic cylinder means having a stationary piston and reciprocable cylinder which is operatively connected with said walking beam.

3. In the combination called for in claim 1 said hydraulic circuit means including cross over valve means having two inlet ports and a discharge port with each inlet port being in communication with one of said two inlet/outlet ports and said discharge port being in communication with the hydraulic fluid reservoir tank of the system whereby a portion of the fluid returning from one of said inlet/outlet ports to its associated discharge/return port of said pump may be diverted to reservoir means, and make-up means for delivering to said pump an amount of fluid to compensate for said amount diverted to reservoir means.

4. In the combination called for in claim 3, a relief valve having its inlet in communication with said discharge port and its outlet in communication with said reservoir means.

5. In the combination called for in claim 1 separate conduit means interconnecting each of said pump discharge/return ports with one of said double-acting hydraulic cylinder means inlet/outlet ports and pressure relief valve means interconnecting each of said separate conduit means with the other separate conduit means whereby excess pressure in one separate conduit means is relieved into the other separate conduit means.

6. In the combination called for in claim 5 a separate pressure responsive switch having a pressure sensing connection communicating with one of said separate conduit means and being electrically interconnected with said prime mover for de-energizing the same when the pressure in either of said separate conduit means rises above a predetermined value.

7. In the combination called for in claim 1 said second double-acting cylinder means having a flow control in communication with each of its said inlet/outlet ports so as to control the rates of flow of hydraulic fluid leaving said second double-acting cylinder means thereby controlling the rates of action of said double-acting cylinder means and in turn the rate of shifting of said swashplate in each direction and the rate of each reversal of said pump.

8. In the combination called for in claim 1 said outlet port of said four-way valve having a flow control valve in communication therewith so as to control the rate of flow of hydraulic fluid leaving said second double-acting cylinder means thereby controlling the rate of action of said double-acting cylinder means and in turn the rate of shifting of said swashplate and the rate of reversal of said pump.

9. In the combination called for in claim 1 said double-acting hydraulic cylinder means having a stationary piston and a reciprocable cylinder which is operatively connected to said walking beam, said piston rod having piston rods of equal size projecting from opposite sides thereof with at least one of said rods being anchored so as to hold said piston stationary.

10. In the combination called for in claim 1 said double-acting hydraulic cylinder means having a stationary cylinder and a reciprocable piston and rod which is operatively connected to said walking beam.

* * * * *